R. HUFF.
HYDROCARBON MOTOR.
APPLICATION FILED MAR. 20, 1909.
1,080,761.
Patented Dec. 9, 1913.
2 SHEETS—SHEET 2.
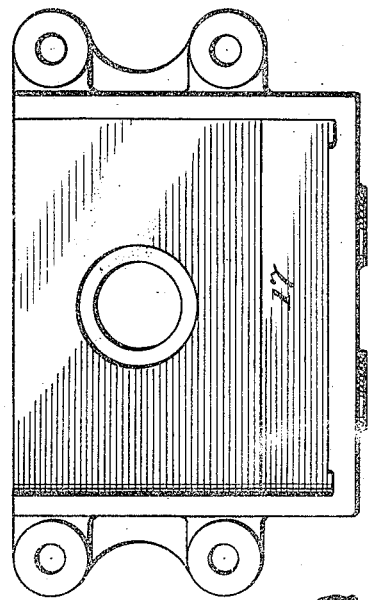
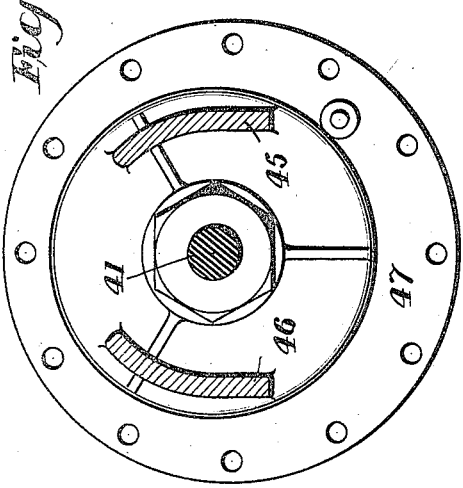
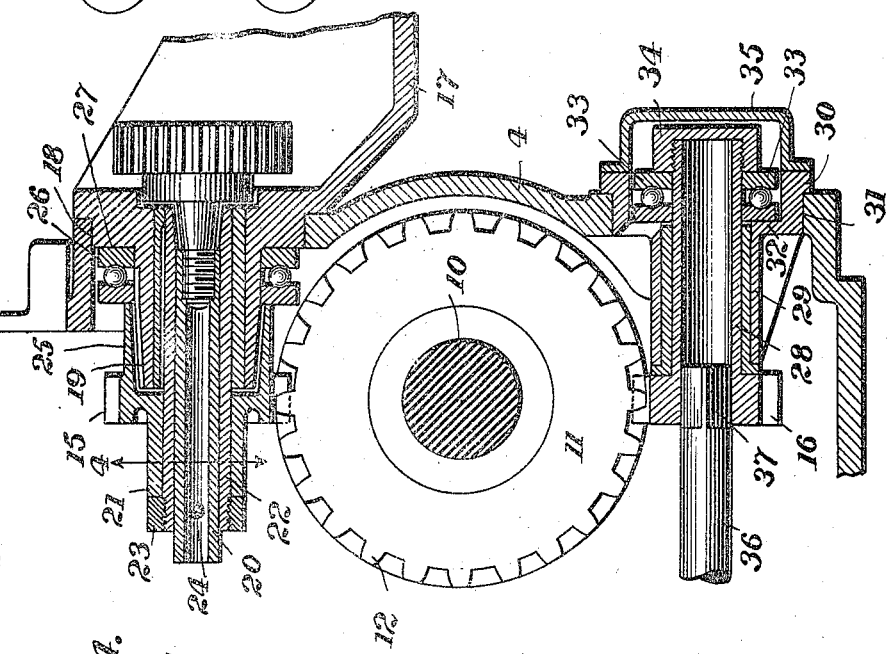
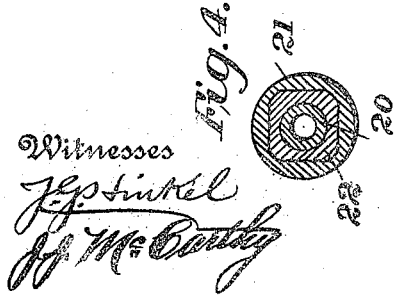
Inventor
Russell Huff
By
Foster, Freeman, Watson & Coit
Attorneys

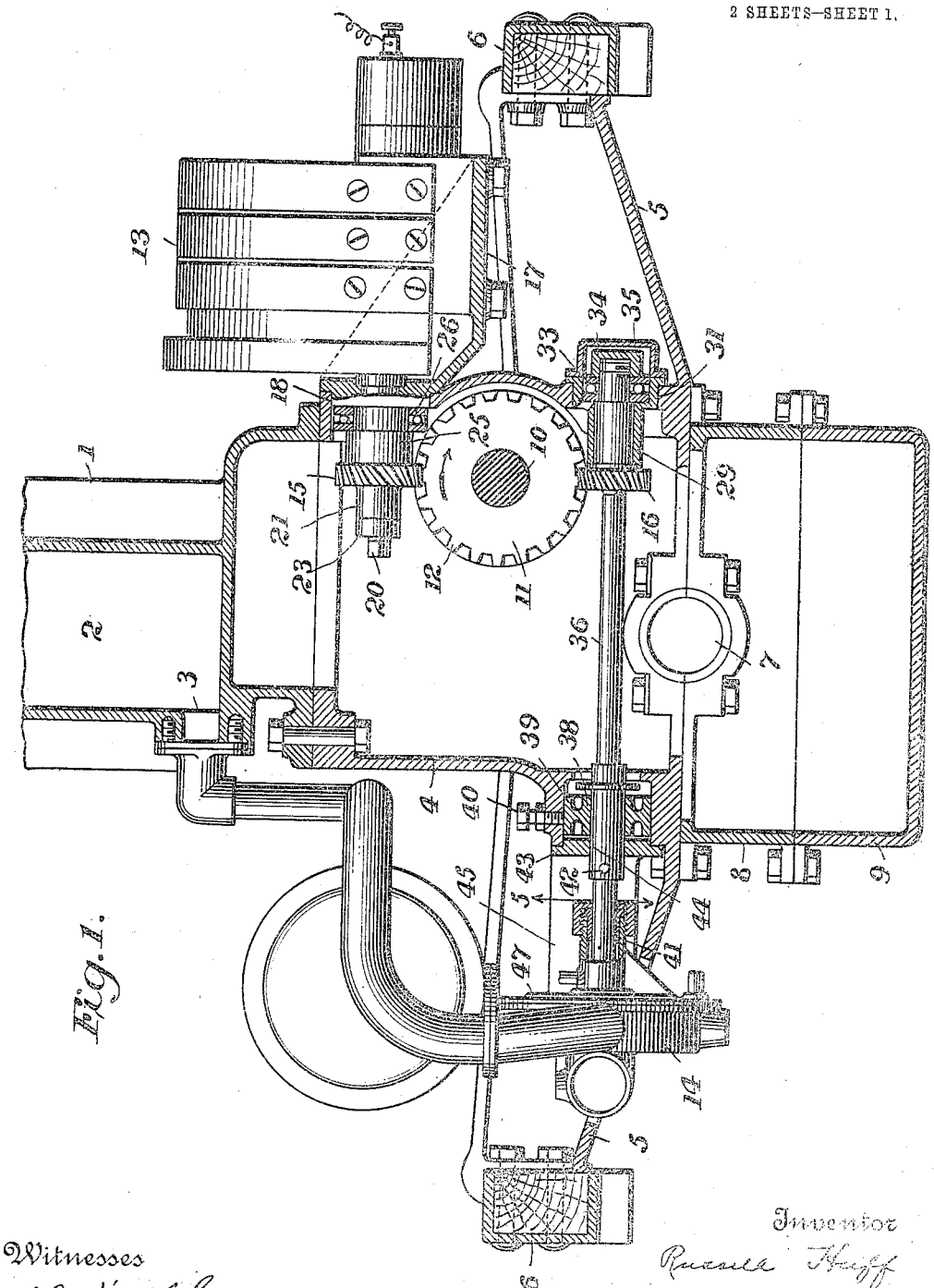

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

HYDROCARBON-MOTOR.

1,080,761.

Specification of Letters Patent. Patented Dec. 9, 1913.

Application filed March 20, 1909. Serial No. 484,833.

*To all whom it may concern:*

Be it known that I, RUSSELL HUFF, a citizen of the United States, and resident of Detroit, in the county of Wayne and State of Michigan, have invented certain new and useful Improvements in Hydrocarbon-Motors, of which the following is a specification.

My invention relates to motor vehicles and particularly to the construction and arrangement of the motor in such vehicles.

In one embodiment of my invention I have shown an internal combustion motor of the water cooled variety mounted low in the vehicle frame, a low hung motor being desirable to lower the center of gravity and for other well known reasons. In motor vehicles, also, the width of the frame at the sides of the motor is limited by well established designs and it is therefore necessary that all the operating parts of the motor shall be contained within a very limited compass. In most water cooled motor vehicles the radiator for cooling the circulating water is placed as low as possible on the frame adjacent the motor, and where a centrifugal pump is employed to maintain the circulation it is necessary that it shall be placed low also to keep it primed and to get the best results. This pump is of course driven by the motor and constitutes one of several auxiliary devices which the motor drives in its normal operation and in practice it is found desirable to drive such pump at slightly greater than crank shaft speed. Another of such auxiliary devices is a magneto or generator and it is desirable that this shall be placed conveniently for inspection and adjustment. If a magneto is employed it is also necessary that it shall be driven at the same speed as the crank shaft of the motor. As a magneto or generator is also liable to be short-circuited by water, it is desirable to carry it high so that in fording streams with the vehicle it will not be so liable to injury from this cause.

For the above reasons, it will be seen to be impracticable to secure the results above indicated by driving the pump and magneto from the same shaft, and while this might be in some other respects desirable, it is found to be more advantageous to operate each of these auxiliary devices on a separately driven shaft. In my present invention, I have shown the shafts of these devices driven by the same driving gear although the pump is at one side of the motor and placed in low relation thereto and the magneto is at the other side and located at a convenient and accessible position above the frame of the vehicle.

Various advantages accrue in consequence of the construction and arrangement of my motor, and these will appear in the following detail description.

In the drawings: Figure 1 is a part sectional view on a transverse vertical plane between two cylinders of a motor vehicle embodying my invention, showing the water jacket in section; Fig. 2 is an enlarged sectional view of the driving gear on the valve shaft and the connected driven shafts and bearings; Fig. 3 is an end view of the bracket for supporting the magneto; Fig. 4 is a section taken on the line 4—4 of Fig. 2; and Fig. 5 is a section taken on the line 5—5 of Fig. 1.

1 represents one of the cylinders of a multi-cylinder motor, the cylinders being cast in pairs so that the water jacket 2 is common to both cylinders of a pair for a certain distance between the cylinders as is usual in such motors. The water inlet to the jacket 2 is shown at 3. The cylinders 1 are bolted to the top of the supporting section 4 of the crank case, which section has laterally extending arms 5 with ends resting on and bolted to the side members of the vehicle frame 6. These arms and side members of the frame constitute side supports for the crank case and motor. The crank shaft bearings 7 are shown suspended between the section 4 and the intermediate section 8 of the crank case, the crank shaft, connecting rods and piston being omitted in Fig. 1 for clearness. The bottom of the crank case is closed by the cover 9 which forms an oil well for splash lubrication as is understood.

Mounted in suitable bearings in the supporting section 4 is a valve operating shaft 10 which is geared by two-to-one gears to the crank shaft 7, one of these gears being shown at 11. By this means the valve shaft is driven by the crank shaft at one-half the speed thereof, whereby the valves are operated as in the usual four stroke cycle motor. This shaft 10 is parallel to the crank shaft 7 and as shown is arranged at one side of the crank case. The gear 11 has on its surface the spiral teeth 12 which are adapted to engage similar spiral teeth on the transversely arranged gears for operating the magneto 13 and pump 14. The gear 15 for the magneto is of such size and the parts are so proportioned that the shaft of the magneto will be driven at twice the speed of the shaft 10, and thus at the same speed as the crank shaft 7. The gear 16 for driving the pump is preferably made smaller than the gear 15 so that the shaft of the pump will be driven at a greater speed than the magneto shaft and crank shaft. As above indicated, this greater speed for the pump is desirable in order to create a proper circulation of water around the cylinders.

It will be observed that the magneto 13 is placed above the side supports 5 and side bars of the frame 6 so that it will be in convenient position for operation and so that access may be had to it easily. This magneto is supported on a bracket 17 which is bolted or otherwise securely fastened to the supporting section 4 of the crank case at the opening 18 formed in that case. This bracket is provided with an extended sleeve 19 projecting within the opening 18 and constituting a bearing surrounding the shaft 20 of the magneto. The gear 15 is formed integral with or secured to a short shaft 21 having the bearing sleeve 22 extending within the sleeve 19 and between it and the shaft 20, this sleeve 22 having the outer squared end fitting within the shaft 21 so as to rotate therewith, and having a screw-threaded end adapted to receive the nut 23 for holding the parts together. The sleeve 22 is secured to the shaft 20 by any suitable means such as the pin 24. The shaft 21 has an annular flange 25 surrounding the sleeve 19 and engaging the thrust bearing 26 which is placed against a shoulder 27 of the bracket 17. By this means the end thrust caused by the engagement of the spiral teeth on the gears 11 and 15 is taken up by the bracket 17 through the thrust bearing 26, and is not transmitted to the magneto. The magneto furthermore being carried on the horizontal platform of the bracket 17 has a fixed and definite relation to the bearing formed in the sleeve 19 of that bracket, and therefore the parts may be so adjusted that the shaft of the magneto will accurately fit in the bearing and it is not necessary to have adjustable means fo coupling the shaft of the magneto to the shaft which drives it. The driving connection for the shaft of the magneto being made through the squared end of the sleeve 22 permits longitudinal adjustment of the magneto to proper position and there is no end thrust on this connection.

The gear 16 for driving the pump is formed with or carried by a short shaft 28 which is mounted to turn in an elongated sleeve 29 of a bracket 30, which bracket is placed in an opening 31 in the supporting section 4 of the crank case, and is secured to that case by any suitable means such as bolts. The sleeve 29 is formed with a shoulder 32, facing outwardly near its end, and a thrust bearing 33 fits against this shoulder and is engaged on the outer side by a cap 34 carried by the outer end of the shaft 28, and thus the end thrust on the shaft 28 caused by the engagement of the inclined or spiral teeth on the gears 11 and 16 is taken up by the bracket 30 through the thrust bearings 33. A cap or cover 35 is placed over the exposed outer end of the shaft 28 and the thrust bearing. It will be observed that the driving gear 16 for the pump is low in the crank case, and is opposite the side supports 5 and 6, and that the pump 14 is on the opposite side of the crank case between the side member 6 and that case. The pump is thus not only in convenient position out of the way, but is so low that it will be kept primed by gravity. Since the pump is so far removed from the driving shaft 10 and since it is placed down opposite the side supports it is necessary to have a driving shaft of peculiar construction which will enable it to be easily removed from the machine. It is impossible to have a single long driving shaft adapted to be removed only by drawing it from the case longitudinally, since the side support is in the way. As shown in the drawing, I use a shaft 36 extending across the supporting section 4 of the crank case and having a squared or angular shaped end 37 fitting within a similarly shaped socket in the end of the shaft 28, thus forming a slidable driving connection which is sufficiently loose to permit the shaft 36 to bend slightly in relation to the shaft 28, thus furnishing practically a universal joint between the parts. The opposite end of this shaft 36 is mounted in a bearing 38 held in an opening 39 by screw 40. The shaft 41 of the pump fits in a socket formed in the end of the shaft 36 and the parts are secured so that they will rotate together by any suitable means, such as pin 42.

The pump 14 is of the rotary type and is carried on a bracket 43 secured to the section 4 over the opening 39 by any suitable means such as bolts. The end of this bracket has an opening 44 for the passage of the shaft 36. The bracket also has the side webs 45, 46 on opposite sides of the shaft 41, and these webs are preferably formed integral with the cover 47 of the pump. It will be observed that this form of bracket facilitates centering the pump in line with its drive shaft 36 and furnishes simple and efficient means for properly supporting it in position. The gear 16 for driving the pump is preferably made of less size than the gear 15 on the magneto shaft so that the pump will be driven at a greater speed than the crank shaft and it will be clear that it can be driven at any speed desired by using a gear of proper size.

It is believed that the operation and advantages of the device will be apparent to those skilled in the art from the above description.

It will also be understood that the various features of my invention are not confined to the particular form and arrangement shown and are applicable to other uses.

Having thus described the invention, what is claimed is:

1. In a motor, the combination with the crank case provided with a shaft opening in one side, of a bracket secured to said case having a sleeve fitting in said shaft opening and adapted to support a magneto.

2. In a motor, the combination with the crank case provided with a shaft opening in one side, of a bracket secured to said case having a sleeve fitting in said shaft opening, a magneto carried by said bracket, and a shaft for said magneto having a bearing in said sleeve.

3. In a motor, the combination with the crank case provided with a shaft opening in one side, of a bracket secured to said case adjacent said opening, a magneto carried by said bracket, and a shaft for said magneto having a bearing in said opening.

4. In a motor, the combination with the crank case provided with a shaft opening in one side, of a bracket secured to said case having a sleeve fitting in said shaft opening and adapted to support operating mechanism, and a shaft for operating said mechanism having a bearing in said sleeve.

5. In a motor, the combination with the crank case provided with a shaft opening in one side, of a bracket secured to said case having a sleeve fitting in said shaft opening and adapted to support operating mechanism, a shaft for operating said mechanism having a bearing in said sleeve, and an end thrust bearing on said shaft engaging said sleeve.

6. In a motor, the combination with the crank case provided with a shaft opening in one side, of a bracket secured to said case having a sleeve fitting in said shaft opening and adapted to support operating mechanism, a shaft for operating said mechanism having a bearing in said sleeve, an end thrust bearing on said shaft engaging said sleeve, a spiral gear on said shaft within the gear case, and an intermeshing gear for driving said shaft.

7. In a water-cooled hydrocarbon motor, the combination with the crank shaft and the valve shaft driven therefrom and mounted parallel therewith, of a spiral driving gear on said valve shaft, a magneto geared to the top of said driving gear and a water pump for the circulation system geared to the bottom of said driving gear.

8. In a motor, the combination with the crank shaft and the valve shaft driven therefrom and mounted at one side of and parallel therewith, of a transverse shaft mounted adjacent said valve shaft and geared thereto, an auxiliary device mounted on the opposite side of the motor from said valve shaft and having an elongated driving shaft extending across the motor, and a driving connection between the end of said elongated shaft and said transverse shaft permitting a slight universal movement between said shafts.

9. In a water-cooled hydrocarbon motor, the combination with the crank shaft and the valve shaft driven therefrom and mounted parallel therewith, of a spiral driving gear on said valve shaft, a magneto shaft extending transversely of the motor, a gear on said magneto shaft engaging the top of said driving-gear, a pump shaft extending transversely of the motor below said valve shaft, and a gear on said pump shaft engaging the bottom of said driving-gear.

In testimony whereof I affix my signature in presence of two witnesses.

RUSSELL HUFF.

Witnesses:
  I. HARDING,
  E. H. KING.